INVENTOR:
JAMES K. BERGER
BY
Joseph R. Dwyer
ATTORNEY

INVENTOR:
JAMES K. BERGER
BY
Joseph R. Dwyer
ATTORNEY

United States Patent Office 3,540,022

Patented Nov. 10, 1970

3,540,022

ROTATING MEMORY CLOCK RECORDER

James K. Berger, Sherman Oaks, Calif., assignor to Singer-General Precision, Inc., a corporation of Delaware Filed Mar. 15, 1968, Ser. No. 713,547
Int. Cl. G11b *23/30, 27/10, 27/12*
U.S. Cl. 340—174.1 7 Claims

ABSTRACT OF THE DISCLOSURE

Electronic apparatus for magnetically recording a pre-selected number of clock pulses on a rotating magnetic memory. The reference pulse is recorded on the clock channel and, upon the next rotation, this initiates the recording of a pre-selected number of clock pulses, at some arbitrary frequency on an auxiliary recording channel. Circuitry detects the lack of closure or the overlap between the reference pulse and the end of the clock pulses and automatically adjusts the frequency of the clock recording oscillator to achieve coincidence. The recorded clock is then transferred from the auxiliary recording channel to the clock channel. During this transfer, the pulses are smoothed to remove phase jitter.

Figure 1:
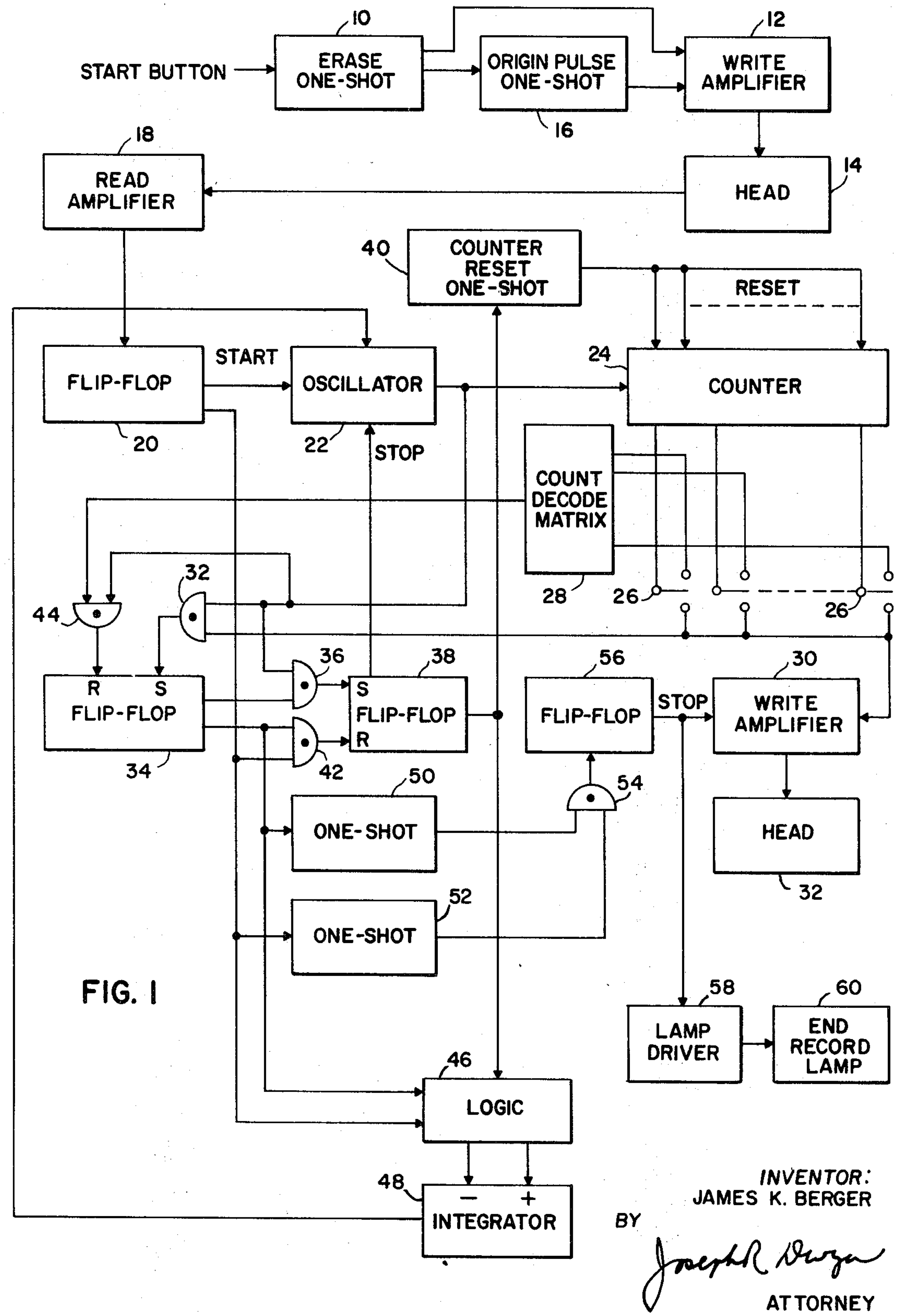

All digital computing equipment requires some means for timing the various operations of the equipment. This timing means, referred to as a clock, is generally produced by an oscillator that generates pulses or sine waves at some constant frequency. In digital magnetic memory devices, such as magnetic tapes, drums or disks, the movement of the memory device cannot be made at a constant speed or without some variations. Thus, if a constant frequency oscillator were used to time the operation of this type of memory, serious inaccuracies would result. For this reason, it is the practice to permit the moving memory device to generate the timing clock pulses. This is accomplished by recording the clock pulses on one track or channel of the memory device.

In rotating memories, such as drum and disks, it is necessary that the clock pulses be equally spaced over the entire clock track. It is further necessary that there be some pre-selected number of pulses in the clock track. Thus, the problem has been one of spreading some pre-selected number of pulses over a given track length and to obtain an accurate closure between the first and last pulses. In the early days of digital computers where the number of clock pulses per inch was quite low, accurate clock recording was done by the use of a mechanical dividing head to inscribe the required number of equally spaced grooves in a clock track. These grooves were then filled with a ferrite material and the entire clock track was then burnished so that only the ferrite-filled grooves remained to perform the clocking function. This technique obviously cannot be used where it is desired to record a clock track having a density much greater than one thousand pulses per inch on the clock track.

Electronic "dividing head" techniques have been developed for recording high density clock tracks. One popular technique used by many manufacturers is to record a clock track by trial and error on a master drum or disk. All subsequent drums or disks are then rotated on the same shaft with the master and the clock is transferred. Other techniques that do not require a master disk or drum comprise the recording of a reference pulse on an auxiliary channel and then manually adjusting a pulse oscillator from its predetermined nominal frequency until gating circuits indicate coincidence between the reference pulse and the final pulse in the string of clock pulses to be recorded. While such techniques are satisfactory for many memory applications, they are exceedingly time consuming and thus inadequate where it is necessary to record clocks of different number of pulses or where it is necessary to rotate the memory device at various speeds, thus requiring different oscillator frequencies.

The clock recorder of the present invention will accurately record any desired number of clock pulses within only a few revolutions of the memory device which may be operating at any fixed rotational speed.

Briefly described, the clock recorder comprises a means for recording a reference pulse on the selected clock track of a rotating recording device, a voltage-controlled variable frequency oscillator which records the clock pulses on an auxiliary track, a bank of manually operated count selection switches, a pulse counter which counts up to the number of pulses selected by the selection switches, and circuitry which senses the lack of closure or the overlap of the clock track and automatically readjusts the variable frequency oscillator to achieve closure. When the clock has been closed on the auxiliary track it is transferred back to the clock track through circuitry which removes jitter or other phase inaccuracies.

Figure 2:
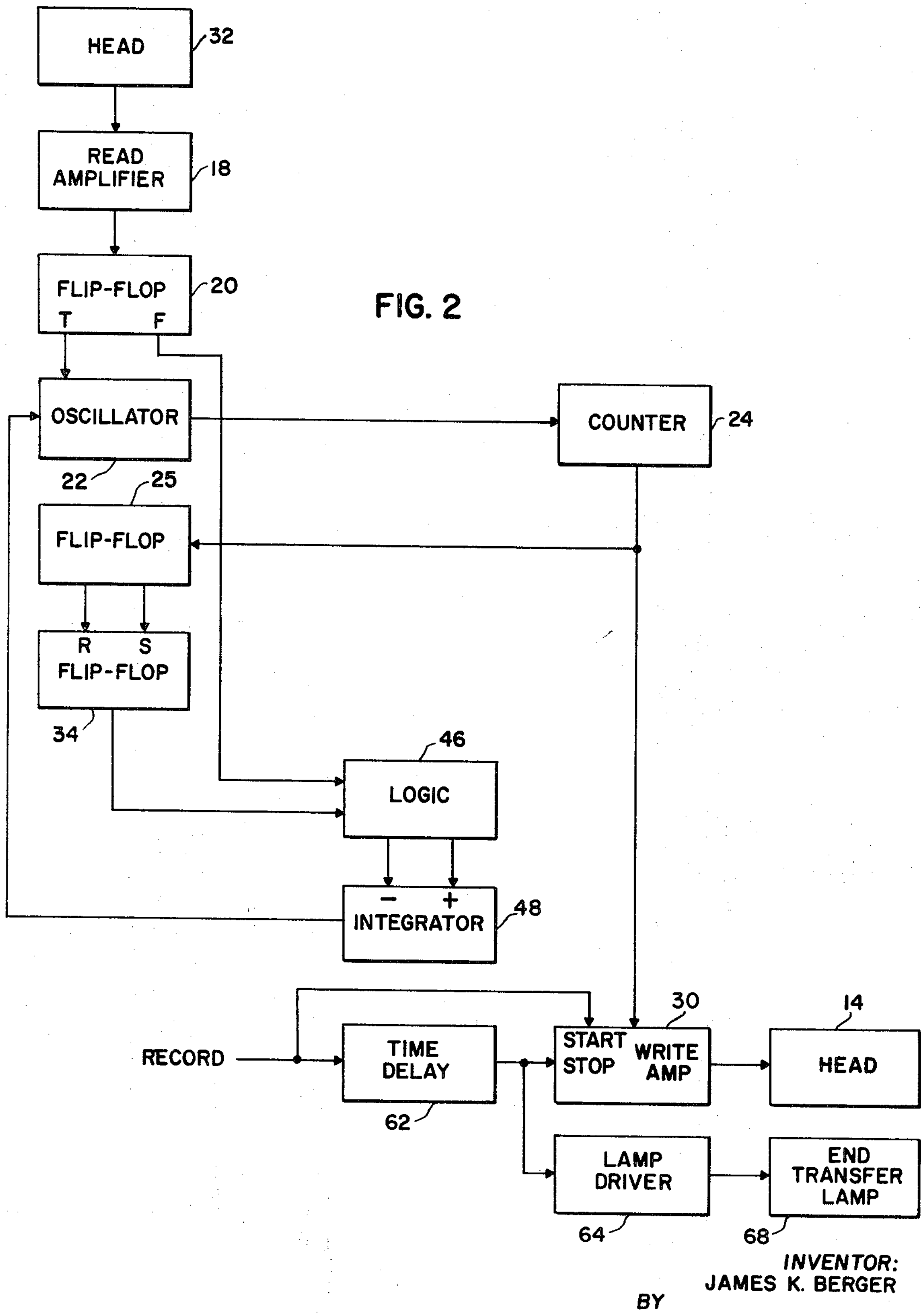

In the drawings, which illustrate embodiments of the invention:

FIG. 1 is a block diagram illustrating the various circuits required for recording a clock track; and FIG. 2 is a block diagram illustrating the circuits required for transferring the clock from the auxiliary track to the clock track.

The recording of a clock with the clock recorder consists of two operations. In the first operation an origin pulse is written on one track of the rotating memory, and using this as a reference, a rough clock is recorded on a second track. In the second operation, the rough clock is smoothed and transferred back to the track which contained the origin pulse.

FIG. 1 is a block diagram of the circuitry for writing the origin pulse and for recording the rough clock track. Depressing the start button will trigger one-shot 10 which serves to erase any existing data appearing on the clock track. One-shot 10 must remain triggered for several revolutions of the rotating memory in order to completely erase the track and, accordingly, may have a period in the order of 275 milliseconds. One-shot 10 is connected to write amplifier 12 which, during the trigger period of one-shot 10, will draw current in a first direction through recording head 14 to perform the erasure. The output of one-shot 10 is also connected to a second one-shot multivibrator 16, so that the reset of one-shot 10 will trigger one-shot 16. One-shot 16 is connected to write amplifier 12 and, when triggered, forces current through head 14 in the oposite direction from the erase current. One-shot 16 may have a period of approximately 16 microseconds. When this period is completed, current is then reversed to the first direction through recording head 14 and then permitted to decay to produce an NRZ origin pulse on the recording track of a 16 microsecond duration.

Upon the first complete rotation of the rotating memory, the origin pulse appearing on the clock track will be sensed by head 14 and will be amplified by read amplifier 18. The output of read amplifier 18 is connected to a complementing flip-flop 20 which will change its state to either direction upon receiving an origin pulse signal from read amplifier 18. The true output of flip-flop 20 is connected to the "start" terminal of oscillator 22 so that when flip-flop 20 receives its first triggering signal, it will start oscillator 22. Oscillator 22 is a voltage controlled variable frequency oscillator capable of operating in the range of 2.4 to 5.0 megahertz and is preferably free running multivibrator for producing a square wave output.

The output of oscillator 22 is connected to a 20 bit counter 24 which may consist of 20 serially connected stages of flip-flops. Each stage of counter 24 is connected to the center arm 26 of a single-pole double-throw switch. The twenty switches are preferably mounted on the front panel of the clock recorder and, as will be subsequently described, are used to select the approximate recording frequency and to select the exact number of clock pulses to be written. When the armature 26 of a single-pole double-throw switch is in a first direction, the counter output is directed into a count decode matrix 28, the function of which is to produce an output signal when the count selected by the switching of a particular combination of single-pole double-throw switches has been reached. The second contacts of the single-pole double-throw switches are connected together and are coupled to write amplifier 30. If it is desired to write a clock track in the frequency range of oscillator 22, that is in a frequency ranging from 2.4 to 5.0 megahertz, the single-pole double-throw switch connected to the least significant bit of counter 24 would be switched so that write amplifier 30 would sense that least significant bit. On the other hand, if it was desired to write at approximately one half the basic frequency, the switch connected to the second least significant bit would be enabled. The output of write amplifier 30 is connected to recording head 32, which is positioned adjacent an auxiliary track on the rotating memory for recording the rough clock generated by oscillator 22 and suitably divided by the selection of the switches connected to the output of counter 24.

As previously indicated, the first position contacts of the single-pole double-throw switches are coupled to count decode matrix 28, which serves to isolate all of the conductors associated with the first contact position of the single-pole double-throw switches and which produces an output corresponding to a particular pre-selected count of counter 24.

The second or frequency determining contacts of the single-pole double-throw switches which are connected to the input of write amplifier 30 are also connected to one input terminal of AND gate 32, the second input terminal of which is connected to the output of oscillator 22. Gate 32 will thus pass a signal upon the first oscillator pulse after the occurence of the selected bit produced by counter 24. The output of AND gate 32 is connected to the "set" input of a flip-flop 34, the re-set terminal of which is coupled to the output of count decode matrix 28. The "true" output of flip-flop 34 is connected to one input of AND gate 36, the second terminal of which is connected to the output of oscillator 22. Thus, gate 36 will pass a signal upon the next pulse from oscillator 22 after flip-flop 34 has been set. The output of gate 36 is coupled to the set terminal of flip-flop 38, the true output of which is connected to counter re-set one-shot 40 which is initiated by the trailing edge of the signal from flip-flop 38. One-shot 40 may have a period in the order of 750 nanoseconds, and upon the completion of the 750 nanosecond pulse, the output of one-shot 40 will reset counter 24 for a new operation. The false output of flip-flop 38 is connected to the "stop" terminal of oscillator 22, so that when flip-flop 38 is switched by a reset signal, it will stop oscillator 22 as well as initiate one-shot 40 to reset counter 24.

Flip-flop 38 is reset by AND gate 42, which transmits a signal only after the flip-flop 34 and the flip-flop 20 have both been reset. Flip-flop 34 is reset by the simultaneous occurrence of a signal from count decode matrix 28 and a pulse from oscillator 22. Thus, decode matrix 28 will condition AND gate 44 when the pre-selected number of pulses for the clock track have been counted. Upon the next pulse of oscillator 22, the preconditioned gate 44 is enabled to reset flip-flop 34. The reset of flip-flop 34 will condition AND gate 42 which will not pass a signal until flip-flop 20 is reset by the next occurrence of the origin pulse detected by head 14.

To briefly summarize the operation to this point, head 14 detects the origin pulse and turns flip-flop 20 to its true state. This starts oscillator 22 and counter 24. Count decode matrix 28 will signal when the desired number of pulses have been reached according to the setting of the single-pole double-throw switches. These switches are also used to select the approximate recording frequency and this signal will turn flip-flop 34 to its true state upon the recording of the first bit. Upon the next occurrence of the origin pulse, flip-flop 20 is turned to its false state. Upon the completion of the pre-selected number of pulses from count decode matrix 28, flip-flop 34 is turned to its false state. In order to close the clock track without gap or overlap, it is necessary that flip-flop 20 and flip-flop 34 are turned to their false state simultaneously. When this occurs, flip-flop 38 will stop oscillator 22 and reset counter 24. The writing of the rough clock track has now been completed. The problem, of course, is to adjust oscillator 22 so that proper clock track closure occurs, i.e., flip-flop 20 and flip-flop 34 are simultaneously turned to their false state.

The false output of flip-flop 20 and the false output of flip-flop 34, together with the true output of flip-flop 38, are connected to logic circuitry 46, which consists of decoding gates that sense the lack of coincidence between the switching of flip-flops 20 and 34 to their false states. Logic 46 is connected to inverting and non-inverting inputs of an operational amplifier which forms an integrator 48, and which produces a voltage output that increases by an amount proportional to the amount of time that the reset of flip-flop 20 preceded the reset of flip-flop 34; or decreases by an amount proportional to the time that the reset of flip-flop 34 preceded the reset of flip-flop 20. The output of integrator 48 is connected to the voltage controlled variable frequency oscillator 22 in order to adjust the frequency of oscillator 22 to achieve closure of the clock track. It is important to note that the adjustment of oscillator 22 takes place after a complete write cycle has been attempted. If oscillator correction were performed during the writing cycle, additional phase jitter problems would result.

Proper closure of the clock track, i.e., simultaneous reset of flip-flop 20 and flip-flop 34, is sensed by circuitry comprising a 50 nanosecond one-shot 50 connected to the false output of flip-flop 34 and an identical 50 nanosecond one-shot 52 connected to the false output of flip-flop 20. The outputs of one-shot 50 and one-shot 52 are compared in AND gate 54. The output of AND gate 54 is coupled to the input of a complementary flip-flop 56, the output of which produces a stop signal to block the operation of write amplifier 30. The output of flip-flop 56 may also be connected to a lamp driver 58 which will light an end-of-record lamp 60 on the front panel of the instrument to indicate completion of the writing of the rough clock on the auxiliary track of the rotating memory.

A rough clock track has now been written on an auxiliary track of the rotating memory. This clock is rough in that it contains bit-to-bit phase jitter. FIG. 2 illustrates portions of the circuitry shown in FIG. 1 which are used to transfer the rough clock from the auxiliary track to the permanent clock track while removing the jitter and performing a smoothing operation.

In FIG. 2, head 32, which was used to record the rough clock on the auxiliary track is now used to read the rough clock. The signal sensed by head 32 is amplified in read amplifier 18 and triggers complementary flip-flop 20. When flip-flop 20 is switched to its true state, it starts voltage controlled variable frequency oscillator 22, which drives counter 24, as described in connection with FIG. 1. In the configuration of FIG. 2, the count decode matrix 28 of FIG. 1 is not used and the frequency determining output of counter 24 is coupled to the input terminal of write amplifier 30 and also to the input of a complementing flip-flop 25. Flip-flop 25 will change its state upon the occurrence of each pulse sensed by write amplifier 30, and is connected to the set and reset terminal of flip-flop 34. The false output of flip-flop 20 and the false output of flip-flop 34 should be in coincidence for proper transferring, and these outputs are connected to logic gates 46, which in turn drive the integrator 48 that produces a voltage signal corresponding to the time differences between the reset of flip-flop 20 and flip-flop 34, as described in connection with FIG. 1. The output of operational integrator 48 is then used to adjust oscillator 22, which will lock into a coherent phase relationship with the rough clock assuring the same number of total pulses per clock track. Since the time constant of the operational integrator 48 is long compared to one revolution of the rotating memory, the smoothed clock does not contain the bit-to-bit phase jitter of the rough clock. Particularly, any existing closure error is integrated over the entire clock and is therefore removed. After the smoothing operation has begun, a "record" signal is initiated to start the operation of write amplifier 30 so that this amplifier will drive recording head 32. The record signal also actuates a time delay 62 which may have a period of several seconds and which produces a signal to stop the operation of write amplifier 30 after that period has elapsed. The output of time delay may also be connected to a lamp driver 64 for controlling an end-of-transfer lamp 68 mounted on the front panel of the clock recorder.

What is claimed is:

1. A clock recorder for writing a pre-selected number of clock pulses on a rotating memory, said recording comprising: first circuit means including a first transducer head for recording an origin pulse on a first recording track of the rotating memory; a voltage controlled variable frequency oscillator; switching means coupled to said first circuit means and to said oscillator and responsive to a first rotational occurrence of said origin pulse for starting said oscillator; counting means coupled to said oscillator for counting the pulses generated therein; selection means coupled to said counting means for producing a first series of pulses having a predetermined frequency relationship with the frequency of said variable frequency oscillator and continuing so long as said oscillator is activated and for producing a stop signal upon the occurrence of a pre-selected number of pulses from said oscillator; control means coupled to said selection means and to said oscillator for de-activating said oscillator in response to said stop signal; second circuit means coupled to said selection means including a second transducer head and responsive to said first pulse signal for writing said pre-selected number of pulses on a second recording track of said rotating memory; bi-polar comparison means coupled to said selection means and to said switching means for sensing the time difference between the occurrence of said stop signal and the second rotational occurrence of said origin pulse and for producing an analog signal having a polarity and amplitude indicative of the amount and polarity of said time difference; control means coupled to said oscillator and responsive to said analog signal from said comparison means for correcting the frequency of said variable frequency oscillator to produce on said second recording track an equal distribution of the pre-selected number of pulses; and gating means coupled to said selection means and to said switching means for sensing the simultaneous occurrence of the selection means stop signal and the origin pulse and for stopping the writing of said second circuit means in response thereto.

2. The recorder claimed in claim 1, wherein said first circuit means includes circuitry for providing an erase current of a predetermined duration in the recording transducer followed by a non-return-to-zero origin pulse of a predetermined duration.

3. The recorder claimed in claim 1, wherein said switching means comprises a complementary flip-flop for starting said oscillator on a first occurrence of said origin pulse and for signalling said comparison means on the next occurrence of said origin pulse.

4. The recorder claimed in claim 1, further including switching circuitry coupled to said selection means and said switching means for stopping said variable frequency oscillator upon the simultaneous occurrence of the selection means stop signal and the origin pulse.

5. The recorder claimed in claim 1, wherein said selection means includes a plurality of manually operated selector switches for establishing said pre-selected number of pulses and for selecting for recording by said second circuit means pulse signals from any stage of said counting means.

6. The recorder claimed in claim 1, wherein said switching means is responsive to the pulses recorded in the second record track of the rotating memory, and said second circuit means is coupled to a further recording track for transferring said further recording track a smooth train of clock pulses related to the pulses recorded on the second recording track.

7. The clock recorder defined in claim 1, in which said second transducer head is conditioned to read the pulses recorded in said second recording track, said switching means is coupled to said second transducer head for starting said variable frequency oscillator in response to pulse signals from said second transducer head so as to cause said oscillator to drive said counting means, said first transducer means is coupled to the output of said counting means for writing a pulse signal in said first recording track; and which includes a further switching means coupled to the output of said counting means, and logic circuitry coupled to the output of said first and second switching means for controlling said comparison means so that said control means corrects the frequency of said oscillator to cause a smooth train of clock pulses to be transferred to said first recording track related to the pulses in said second recording track.

References Cited

UNITED STATES PATENTS

| | | | |
|---|---|---|---|
| 2,903,677 | 9/1959 | Curtis | 340—174.1 |
| 2,926,341 | 2/1960 | Scarbrough | 340—174.1 |
| 3,041,585 | 6/1962 | Wolfe | 340—174.1 |

JAMES W. MOFFITT, Primary Examiner

W. F. WHITE, Assistant Examiner